United States Patent [19] [11] Patent Number: 5,243,803
Tabata et al. [45] Date of Patent: Sep. 14, 1993

[54] MODULE FOR EXPANDABLE FRAMEWORK STRUCTURE AND EXPANDABLE FRAMEWORK STRUCTURE EMPLOYING SAID MODULE

[75] Inventors: Masaki Tabata; Takayuki Koizumi, both of Hyogo, Japan

[73] Assignee: Mitsubishi Denki Kabushiki Kaisha, Tokyo, Japan

[21] Appl. No.: 983,267

[22] Filed: Nov. 30, 1992

Related U.S. Application Data

[63] Continuation-in-part of Ser. No. 728,842, Jul. 9, 1991, abandoned, which is a continuation of Ser. No. 374,006, Jun. 29, 1989, abandoned.

[30] Foreign Application Priority Data

Jul. 5, 1988 [JP] Japan ................ 63-167320

[51] Int. Cl.$^5$ ............................ E04H 12/18
[52] U.S. Cl. ............................ 52/646; 52/645
[58] Field of Search ............. 52/108, 646; 343/915, 343/DIG. 2, 8

[56] References Cited

U.S. PATENT DOCUMENTS

| 4,475,323 | 10/1984 | Schwartzberg | 52/646 |
| 4,482,900 | 11/1984 | Bilek | 52/646 |
| 4,527,362 | 7/1985 | Tobey | 52/646 |
| 4,896,165 | 1/1990 | Koizumi | 343/915 |
| 5,014,484 | 5/1991 | Tanizawa et al. | 52/646 |

OTHER PUBLICATIONS

WO85/02434 International Application Published Under The Patent Cooperation Treaty Jun. 1985; 2 sht of drawing; 14 pp. of spec.

Primary Examiner—Carl D. Friedman
Assistant Examiner—Creighton Smith
Attorney, Agent, or Firm—Wolf, Greenfield & Sacks

[57] ABSTRACT

An expandable framework structure is formed by connecting together a plurality of polygonal prism-like framework structure modules with one side of a module serving also as one side of another module adjacent thereto. A module employed comprises stems each having a joint as well as a slide hinge, pairs of pantograph-like diagonal members and cables. This serves to provide an expandable framework structure having high stability and reliability and which is free from any rattling of the connecting pin at the pin connected portion. Thus, the expandable framework structure provided is highly rigid and hence is capable of maintaining a stable configuration after developed. The module employed also comprises vertical frames, foldable members, main hinges, intermediate hinges and diagonal cables. The rotational axis of the pin of the intermediate hinge deviates from the center axis of the foldable member realized when it has been unfolded. The foldable members and the diagonal cable, when stretched, serve to maintain the configuration of the expandable framework structure stable without additional latch mechanisms. Thus, an expandable framework structure provided requires less components and hence is light and easy to stow away.

9 Claims, 7 Drawing Sheets

MODULE FOR EXPANDABLE FRAMEWORK STRUCTURE AND EXPANDABLE FRAMEWORK STRUCTURE EMPLOYING SAID MODULE

RELATED APPLICATION

This is a continuation-in-part of U.S. patent application Ser. No. 07/728,842 filed July 9, 1991, now abandoned which is a continuation of U.S. patent application Ser. No. 07/374,006 filed Jun. 29, 1989 now abandoned.

BACKGROUND OF THE INVENTION

The present invention relates particularly to an expandable framework structure which is light, highly rigid and easy to stow away for use for a large-diameter expandable antenna designed to be mounted on an artificial satellite.

Recently, the performance of spacecrafts such as the Space Shuttle and Ariane rocket has been improved, and the reliability of these spacecrafts has also been enhanced. Because of this, the economic merits in using the spacecrafts in space have been acknowledged.

A large-sized expandable antenna is inevitably necessary for establishing communications between moving objects such as seacrafts, vehicles and so forth; and a high level of competition in the development of expandable framework structure schemes for use in constituting such a large-sized expandable antenna has been taking place. There is also a plan to build gigantic space bases in space. In addition to its application in spacecraft, the expandable framework structure (expandable truss structure) as a basic structure scheme for such gigantic space bases is now one of the crucial development themes to be dealt with in order to realize the construction of such space bases. It is widely accepted that the expandable structure scheme is one of the most economical ways of constructing a gigantic structure with relative ease.

FIGS. 9 and 10 are, respectively, front and side views of an expandable framework structure, which is in a stowed state, used for a conventional expandable antenna such as the one disclosed in the official gazette of Japanese Patent Public Disclosure No. 59-28704 (1984), and FIGS. 11 and 12 are also front and side views of the same which is in an unfolded state, respectively. In these figures, reference numerals 11a, 11b denote hinges, and reference numerals 12a, 12b frame members adapted to be connected to each other by means of the hinges 11a, 11b at the ends thereof so as to form a hoop-like shape as a whole. Reference numeral 13 denotes support wires, and reference numeral 14 a mesh-like flexible film adapted to function as the reflector of the antenna. This flexible film 14 is designed to be expanded and retained in place by means of the support wires 13, as shown in FIG. 11.

The operation of the above-described expandable framework structure shown in FIGS. 9 to 12 as used with the conventional expandable antenna will be described next. When an artificial satellite is launched, the frame members 12a, 12b which are connected to each other by the hinges 11a, 11b at the ends thereof are, as shown in FIG. 9, folded at the hinged portions and are fixed to the side wall of the satellite by means of fixing devices (not shown). When the satellite has been sent into orbit, the fixing devices are released, and the frame members 12a, 12b are then developed by the action of torque (driving force) generated by spiral springs (not shown) incorporated in the hinges 11a, 11b and are looked in place by means of incorporated latch devices (not shown) when they are developed to a predetermined position, whereby a hoop-shaped frame structure is formed as a whole, as shown in FIG. 11. At the same time as the frame members 12a, 12b are developed, the flexible film 14 secured to the frame members by means of the support wires 13 are also expanded, and when the frame members 12a, 12b have formed the hoop-shaped frame structure, the flexible film 14 is caused to spread out inside the frame members 12a, 12b, and thereby forms an electric wave reflector for the expandable antenna.

In addition, FIG. 13 shows the structure of another conventional expandable framework structure disclosed in the "IEEE TRANSACTIONS ON ANTENNAS AND PROPAGATION", Vol. AP-17, 4th issue (1969). In the figure, reference numeral 21 denotes foldable members constituting the upper and lower triangular frameworks for the expandable framework structure and adapted to be folded at the intermediate positions thereof, and reference numeral 22 diagonal members for supporting the upper and lower triangular frameworks, and reference numeral 23 denotes joints for pins connecting the foldable members 21 and the diagonal members 22.

FIG. 14 is a side view, partially cut away, showing the constitution of the foldable member used with the expandable framework structure shown in FIG. 13, wherein the detailed constitution of the intermediate portion of the foldable member 21 where folding of the same actually takes place is shown. In the figure, reference numeral 21 denotes foldable members; reference numerals 25a, 25b denote rotatable hinge levers comprising two sheets which are pin connected to each other, reference numeral 26 a spiral spring mounted on one 25b of the hinge levers at the joint portion thereof to rotate the hinge levers 25a, 25b in the direction in which the foldable member 21 is developed, and reference numerals 27a, 27b denote connecting pins for connecting the hinge levers 25a, 25b to the foldable member 21 with reference numeral 27c denoting a connecting pin for connecting the foldable members 21 to each other at a position making an intermediate portion of the so connected foldable members 21. FIG. 15 is a side view showing the configuration of the foldable member 21 shown in FIG. 14 which is in an expanded state. FIG. 16 shows the configuration of the expandable framework structure shown in FIG. 13 which is being expanded. The foldable members 21, diagonal members 22 and joints 23 are also shown as being expanded.

The operation of the conventional expandable framework structure shown in FIGS. 13 to 16 will be described below. Initially the expandable framework structure is stowed and retained in that state by means of retaining cables (not shown). Once a command for expansion is sent from the ground, the retaining cables are cut and broken by virtue of an explosion of an explosive tube(s), whereby the expandable framework structure is put ready to expand and starts to expand by the action of the elastic force of the spiral springs 26. The spiral springs 26 rotate associated hinge levers 25a, 25b by virtue of the elastic force thereof, and this in turn rotates the foldable members 21 about associated connecting pins 27c, whereby the foldable members 21 are unfolded. The joints 23 on the upper and lower sides are caused to radially spread out as the foldable members 21 are caused to unfold, and the expansion of the expandable framework structure thus progresses. When the foldable members 21 have been linearly unfolded, the rotational torque generated by means of the hinge levers 25a, 25b which are actuated by the action of the elastic force of the spiral spring 26, balances with the pressure applied to the plane of contact between the respective connected ends of the foldable members 21. This serves to cease the expansion of the foldable members 21, so as to allow them to form a linear configuration as shown in FIG. 15. In this state, the hinge levers 25a, 25b are substantially in parallel to each other, and the angle formed between the center axis of the so expanded foldable members 21 and the hinge levers 25a, 25b is as low as about 15 degrees. Due to this configuration, even if a force is applied to the foldable members 21 in an attempt to re-fold the same, the hinge levers 25a, 25b are caused to thrust out at each other in the axial direction. The hinge levers 25a, 25b thus function as a latch for preventing the re-folding of the foldable members 21.

In the expandable framework structure shown in FIGS. 9 to 12 that is constructed as described above and which was used with a conventional expandable antenna, in a case where, for instance, it is used in constructing a large-diameter expandable antenna, the frame members 12a, 12b which are connected to each other at the ends thereof by means of the hinges 11a, 11b are first expanded to form a single large-diameter hoop-shaped frame structure, and the mesh-like flexible film 14 is supported only by the structure. The flexible film 14 has no highly rigid members thereon except the peripheral portion. This reduces the overall rigidity of the antenna, and hence often causes a problem that the antenna fails to maintain its desired shape in the event that external force acts on the antenna in an attempt to control the direction thereof.

Furthermore, in the case of the conventional expandable framework structure shown in FIGS. 13 to 16 that is constructed as described above, attachments like the hinge levers 25a, 25b which are essentially unnecessary for the construction of the antenna must be provided. This serves to increase the number of components used and hence causes problems such as those of reduction in reliability, weight increase, increase of volume when stowed and so forth.

SUMMARY OF THE INVENTION

The present invention was made to solve the above-mentioned problems. An object of the present invention is to provide an expandable framework structure which exhibits high rigidity, which is light and easy to stow away, and hence which is suitable for use in constructing a large-sized structure like a large-diameter support structure for a reflector for an antenna.

In an expandable framework structure according to the present invention, foldable and expandable framework structure elements are used as base elements and each of the base elements are comprised of stems each of which has a joint and a slide hinge as well as pairs of pantograph-like diagonal members, with each pin connected to the associated joints and slide hinges on the stems as well as to each other at the intermediate portion thereof. The so constituted base elements are connected together so as to form a polygonal prism like a quadrangular or hexagonal prism with one side of the respective base elements serving as a side common to two adjacent base elements. In addition, cables are provided to be stretched, respectively, between the adjacent joints, adjacent slide hinges, diagonally facing joints and diagonally facing slide hinges of a polygonal prism like a hexagonal or quadrangular prism.

In another type of expandable framework structure of the present invention, foldable members which are pin connected to each other by means of an intermediate hinge in such a manner as to linearly extend when developed, are interposed between main hinges in such a manner that the rotational axis of a connecting pin for the intermediate hinge deviates from the central axis of the foldable members, formed after being developed at the pin connected portion of the intermediate hinge. The intermediate hinge has a stopper for restricting the rotation of the foldable members to such an extent that an angle formed by the respective foldable members does not exceed 180 degrees. In addition, cables are provided which are stretched with a predetermined degree of tension between the diagonally facing main hinges on the plane fictitiously including the central axis of the foldable members adapted to linearly extend when developed and parallel to the rotational axis of the connecting pin after the expandable framework structure has been developed.

When used in constructing a large-sized structure like a large-diameter expandable antenna, since the expandable framework structure according to the present invention is constructed such that foldable and expandable framework structure elements serving as base elements comprise stems each having a joint and a slide hinge as well as pairs of pantograph-like diagonal members, each pair of the last being pin connected to the associated joints and slide hinges on the stems, as well as being connected to each other at the intermediate portion thereof, and that the so configured base elements are connected together so as to form a polygonal prism like a quadrangular or hexagonal prism with one side of the respective base elements serving as a side common to two adjacent base elements. I.e. since a number of rigid members are disposed not only on the peripheral portion forming the expandable antenna but also in the internal portion thereof, it is possible to construct a highly rigid expandable framework structure as a whole. In addition, since the cables provided are to be stretched, respectively, between the joints and the slide hinges once the base elements have been expanded, they serve to produce compression forces acting on the diagonal members so as to realize a state of equilibrium. Thus any rattling of the connecting pin at the pin connected portion can be eliminated, and the configuration of the antenna can thus be stably maintained once it has been expanded.

Furthermore, since the expandable framework structure according to the present invention is constructed so that the foldable members connected to each other by means of the intermediate hinge are disposed in such a manner that the rotational axis of the connecting pin deviates from the central axis of the foldable member, realized when they are developed; and the distance between the main hinges disposed at the ends of the foldable member reaches its maximum when the foldable member is unfolded to such an extent that the connecting pins connecting the main hinges and the foldable member at the ends thereof, and the pin of the intermediate hinge are brought into alignment with each other. While the distance becomes substantially less than the maximum when the foldable member is expanded to the final expansion point thereof. The final expansion point of the foldable member referred to herein indicates a state wherein the foldable member is caused to be linearly stretched with a stopper surface formed on the intermediate hinge being brought into contact with a surface corresponding thereto, whereby surface pressure is produced thereat; the expansion of the foldable member thus being restricted by the so produced surface pressure. The diagonal cable provided to be stretched between the main hinges is caused to extend in accordance with the distance between the main hinges; and at the time when the foldable member is unfolded to the final expansion point, the cable is stretched to slightly less than its maximum extent. In contrast, when trying to refold the foldable members from their unfolded state, the diagonal cable must first be stretched to its maximum extention point before it is restored to its folded state. In order to make this possible, extra energy must be applied from outside to stretch the diagonal cable. As is clear from this, the expandable framework structure expanded to the final expansion point is stable in terms of energy, and a stable state such as could be realized by an expandable framework structure with latch mechanisms can thus be realized without any attachment components other than the essentially necessary construction members. Due to the absence of such attachements, the expandable framework structure according to the present invention is highly rigid after being expanded and also light. Moreover, the expandable framework structure of the invention requires less space for stowage, and hence is easy to stow away.

Figure 1:
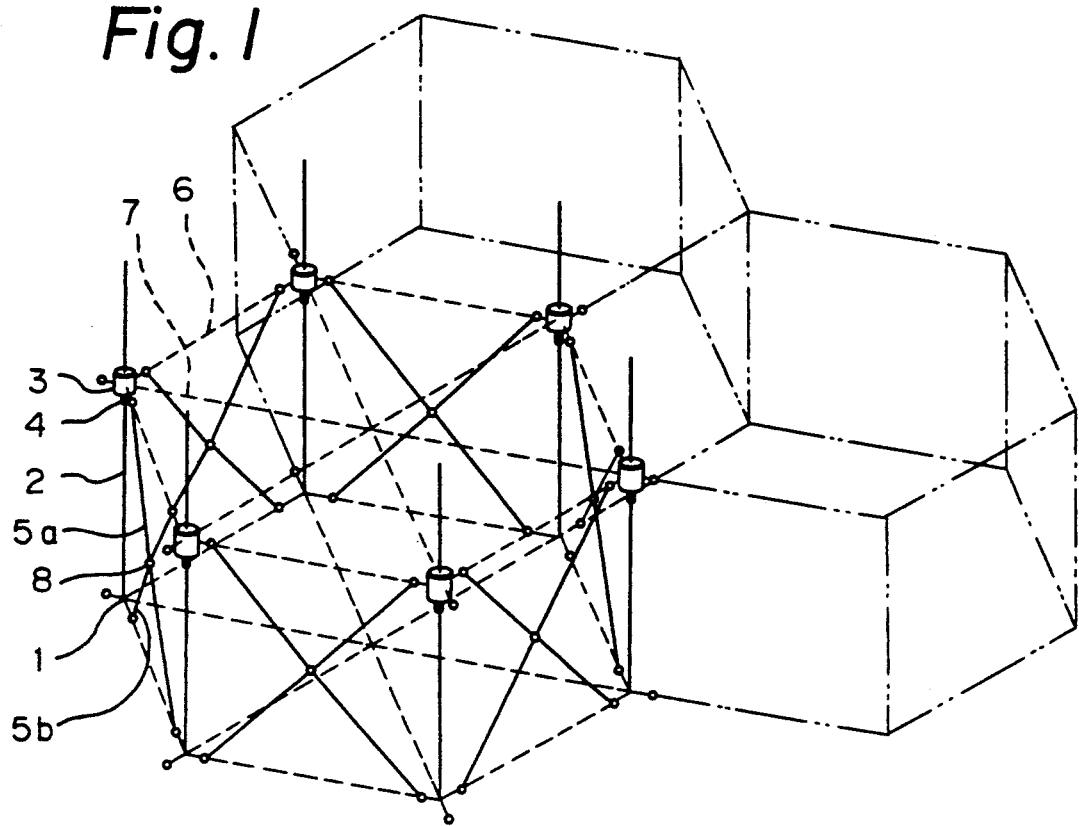
FIG. 1 is a perspective view of an expandable framework structure according to one embodiment of the present invention showing the configuration of the same which has been expanded.
Figure 2:
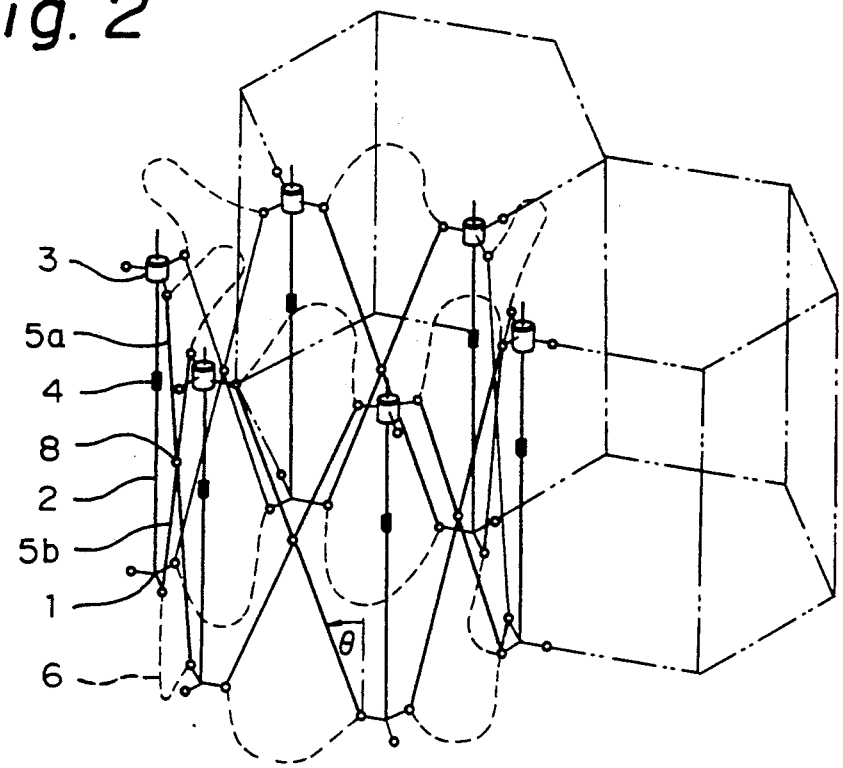
FIG. 2 is a perspective view of the expandable framework structure shown in FIG. 1 showing the configuration of the same which is being expanded.
Figure 3:
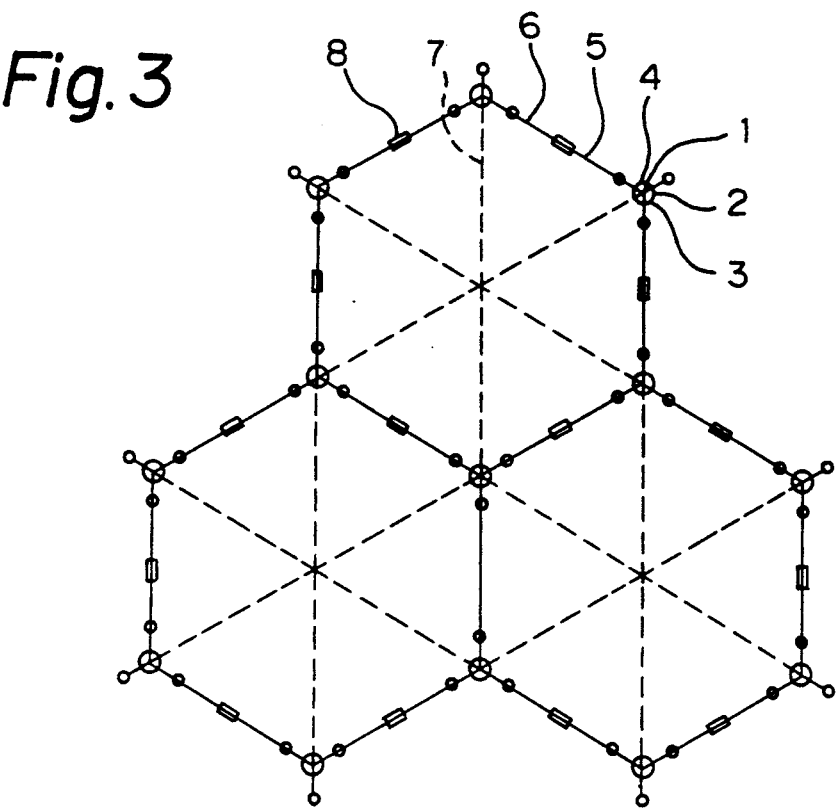
FIG. 3 is a top plan view of the expandable framework structure shown in FIG. 1 showing the configuration of the same which has been expanded.

DETAILED DESCRIPTION OF THE PREFERRED EMBODIMENTS:

FIG. 1 is a perspective view of an expandable framework structure according to one embodiment of the present invention showing the configuration of the same which has been expanded, FIG. 2 is a perspective view of the expandable framework structure shown in FIG. 1 showing the configuration of the same which is being expanded, and FIG. 3 is a top plan view of the expandable framework structure showing the configuration of the same which has been expanded. In these figures, reference numeral 1 denotes a joint having pin-joint portions, reference numeral 2 a stem having such a joint 1 at one end thereof, reference numeral 3 a slide hinge adapted to slide over the stem 2, reference numeral 4 a stopper secured to the stem 2 and adapted to define the bottom dead center for the slide hinge 3, and reference numerals 5a, 5b denote diagonal members. The diagonal member 5a is pin-jointed to the slide hinge 3 at one end thereof and to the joint 1 on an adjacent stem 2 at the other end, and is adapted to rotate about the axis perpendicular relative to the stem 2. The diagonal member 5a and the diagonal member 5b, which is pin-jointed to a slide hinge 3 on the adjacent stem 2, are pin-jointed to each other at an intermediate pin-joint portion 8 so as to form a so-called pantograph-like configuration. Structures comprising the stem 2 and the diagonal members 5a, 5b are connected to each other in a continuous and periodic manner via the joints 1, and the slide hinges 3 so as to form hexagonal prism-like modules which are in turn connected to each other in such a manner, as shown in FIG. 3, that one side of a hexagonal prism-like module serves as a side of an adjacent hexagonal prism-like module in connecting two adjacent modules.

Reference numeral 6 denotes a cable provided to be stretched between the two slide hinges 3 or the two joints 1, and reference numeral 7 denotes a cable provided to be stretched diagonally on the hexagonal plane of the hexagonal prism-like module. These cables 6 and 7 are cut to predetermined lengths in advance so as to exhibit a predetermined tension when they are stretched as intended. The cables 7 are omitted in FIG. 2 in order to avoid any confusion that would be caused by the depiction of the same.

The operation of the expandable framework structure according to one embodiment of the present invention depicted in FIGS. 1 to 3 will be described next. The expandable framework structure of the present invention, when stowed away, is folded to such an extent that the angle 0 (see FIG. 2) formed between the stem 2 and the diagonal member 5a or 5b becomes nearly zero, and the folded state is retained by means of an external retaining device (not shown). In contrast, when it is unfolded, once the retaining device is released, the diagonal members 5a, 5b are expanded by the action of a driving force generated by means of spiral springs (not shown) mounted around pin shafts of the pin-joint portions 8, the joints 1, or the slide hinges 3, and the angle θ increases. At this moment, the slide hinge 3 starts to slide over the stem 2 and gradually approaches toward the vicinity of the joint 1 from a point farthest away from the joint 1 as the diagonal members 5a, 5b develop. When the slide hinge 3 slides to a predetermined position, it comes into abutment with the stopper 4, and the expansion of the diagonal members 5a, 5b is thus ceased. The cables 6, 7 are of such lengths as to be stretched between the joints 1 or the slide hinges 3 under a predetermined tension exhibited in this state, whereby the joints 1 and slide hinges 3 are pressed against the associated diagonal members 5a, 5b, thus eliminating any loose pin joints at the pin-joint portions 8 of the respective joints 1 and slide hinges S. Therefore the present invention can provide a highly rigid expandable framework structure. In addition, since the diagonal members 5a, 5b are pin-jointed not only to the joints 1 and the slide hinges 3 at the ends thereof but also to each other at the intermediate pin-joint portions 8 thereof. The expansion angles θ of all of the diagonal members 5a, 5b become equal, thus making it possible to realize a synchronous expansion.

In this embodiment, when the diagonal members 5a, 5b are in a developed state, the slide hinges 3 are pressed against their associated stoppers 4 to be secured in place at that position by the action of the driving force of the spiral springs that effects the expansion of the diagonal members 5a, 5b. However, suitable latch mechanisms may be provided for latch-securing the slide hinges 3 in place at a predetermined position when they are brought to such a position.

Furthermore, in this embodiment, three hexagonal prism-like modules are connected together as shown in FIG. 3, but it may be possible to combine more hexagonal prism-like modules by repeatedly forming and combining such three-module patterns so that a large-scale expandable framework structure such as used as a reflector support structure for a large-diameter expandable antenna can easily be constructed.

Figure 4:
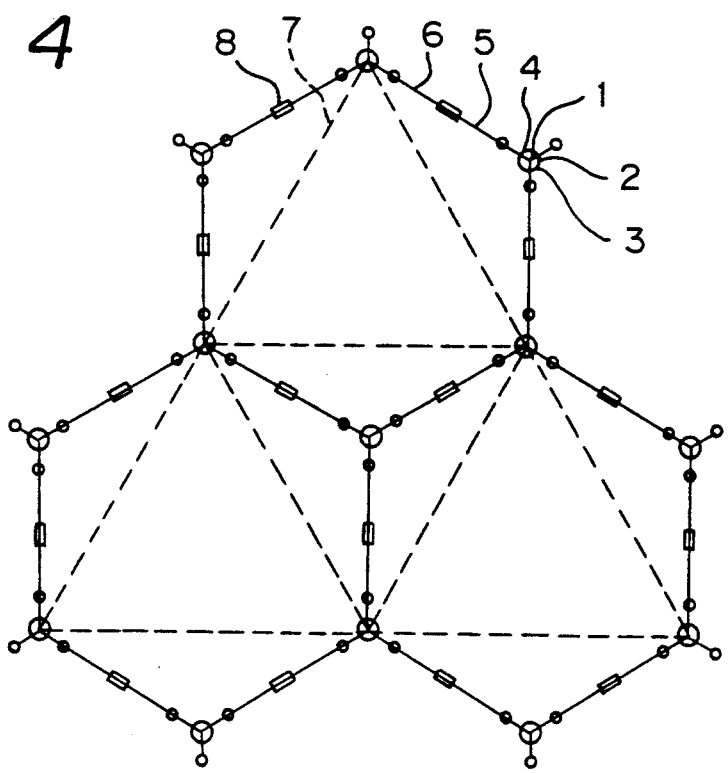
FIG. 4 is a top plan view of an expandable framework structure according to another embodiment of the present invention showing the configuration of the same which has been expanded.

Moreover, in this embodiment, the cables 7 are provided to be diagonally stretched on the hexagonal plane of the hexagonal prism-like module, but the cables 7 may be stretched between the joints or the slide hinges 3 such as to connect them in an alternate manner, forming triangular configurations between the joints 1 or the slide hinges S as is clear from FIG. 4 showing another embodiment of the present invention Furthermore, in this embodiment the spiral springs disposed at the pin-joint portions 8 are used as a driving force to expand the diagonal members 5a, 5b, but tension springs may be provided between the slide hinges 3 and the joints 1 for the same purpose.

Figure 5:
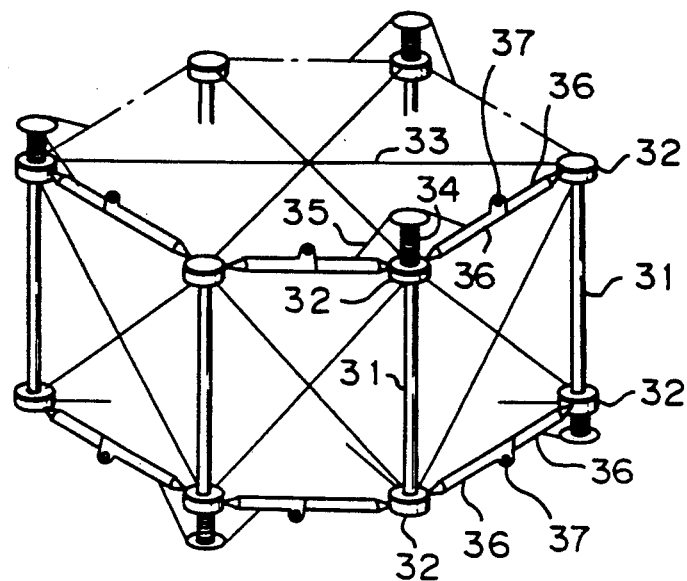
FIG. 5 is a perspective view of an expandable framework structure according to still another embodiment of the present invention showing the configuration of the same which has been expanded.
Figure 6:
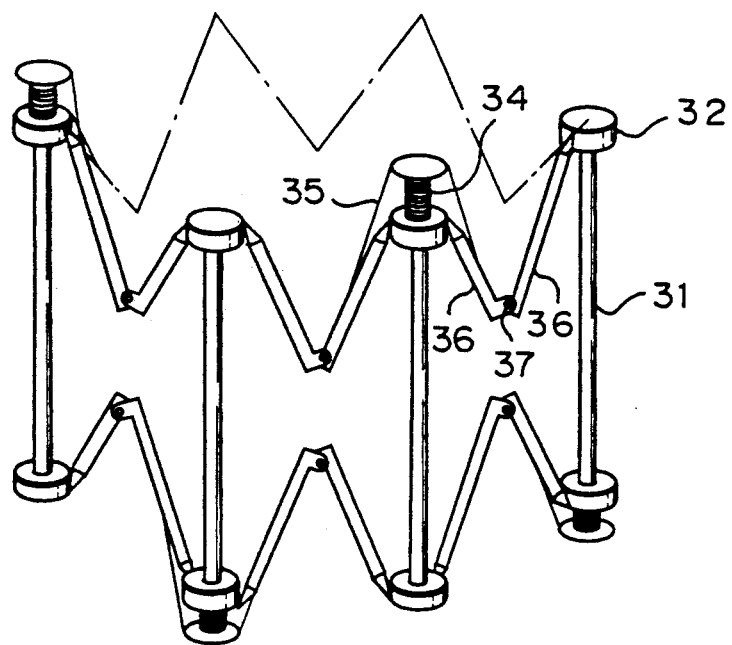
FIG. 6 is a perspective view of the expandable framework structure shown in FIG. 5 showing the configuration of the same which is being expanded.
Figure 7:
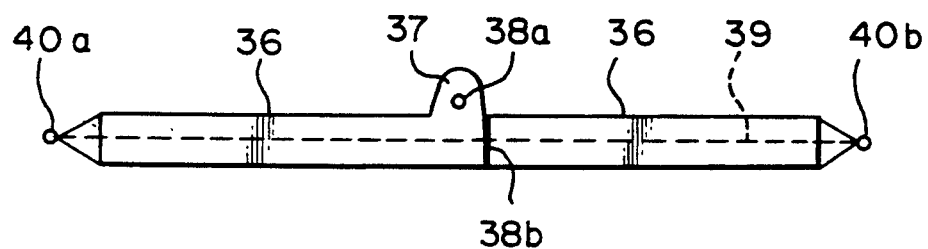
FIGS. 7 and 8 are side views of the foldable members of the expandable framework structure shown in FIG. 5; the former showing the configuration of the same which have been developed and the latter showing the configuration of the same which are being expanded, respectively.
Figure 8:
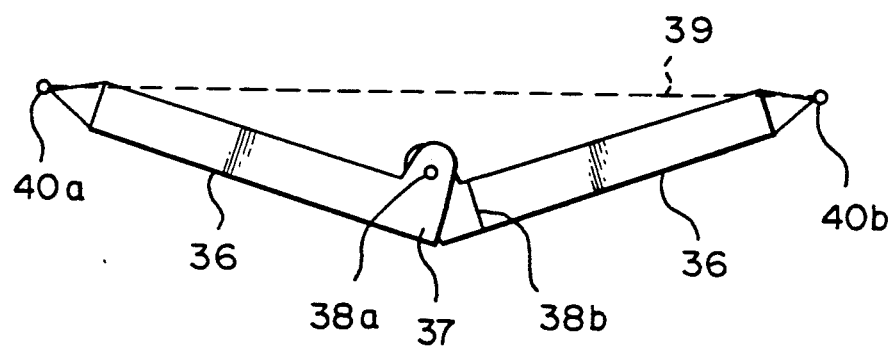
Figure 9:
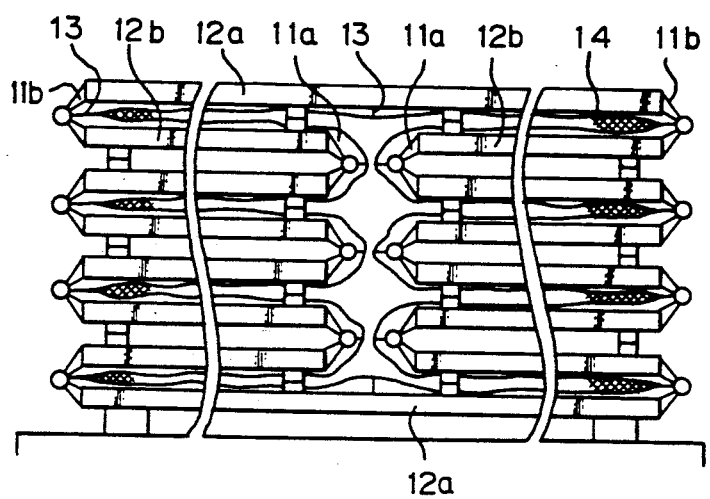
FIGS. 9 and 10 are a front view and side view, respectively, of an expandable framework structure used for a conventional expandable antenna showing the configuration of the same which is folded to stow away.
Figure 10:
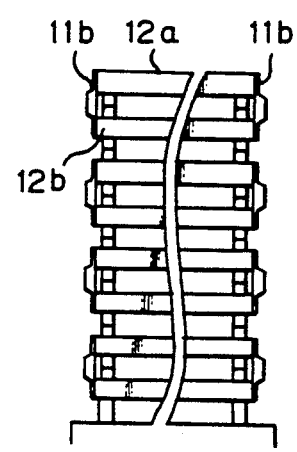
Figure 11:
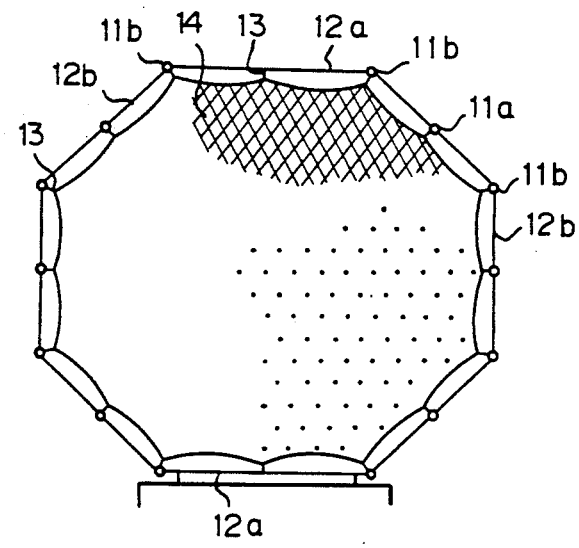
FIGS. 11 and 12 are a front view and side view, respectively, of the expandable framework structure shown in FIGS. 9 and 10 showing the configuration of the same which is expanded.
Figure 12:
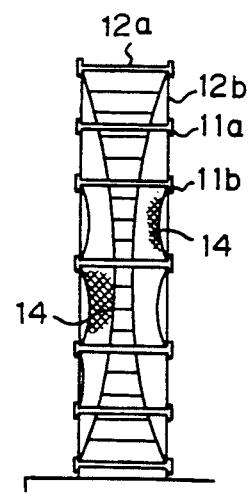
Figure 13:
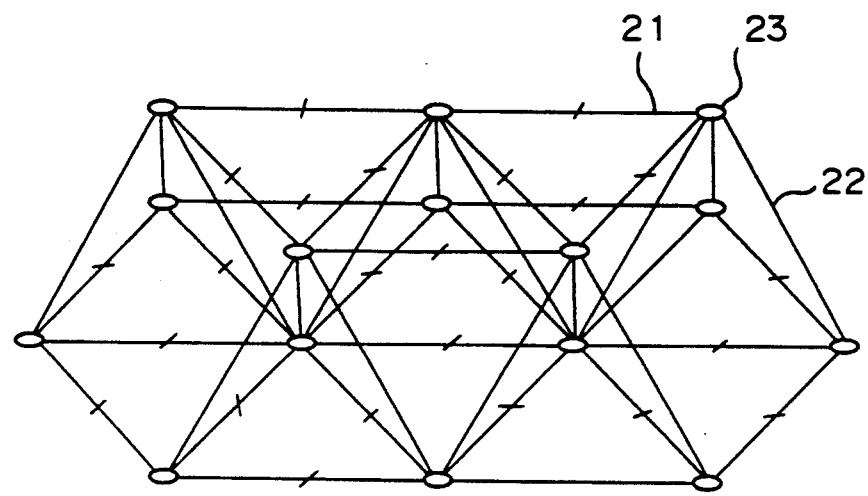
FIG. 13 shows the constitution of the conventional expandable framework structure.
Figure 16:
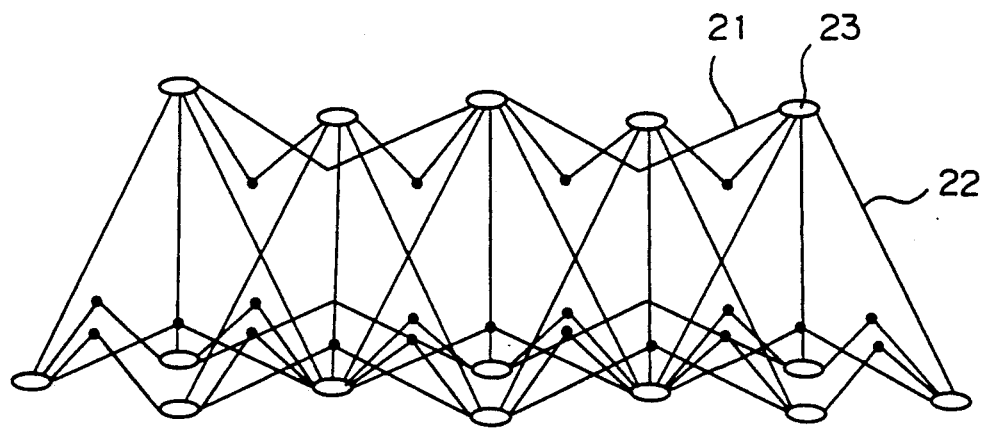
FIG. 16 shows the configuration of the expandable framework structure shown in FIG. 13 which is being expanded.
Figure 14:
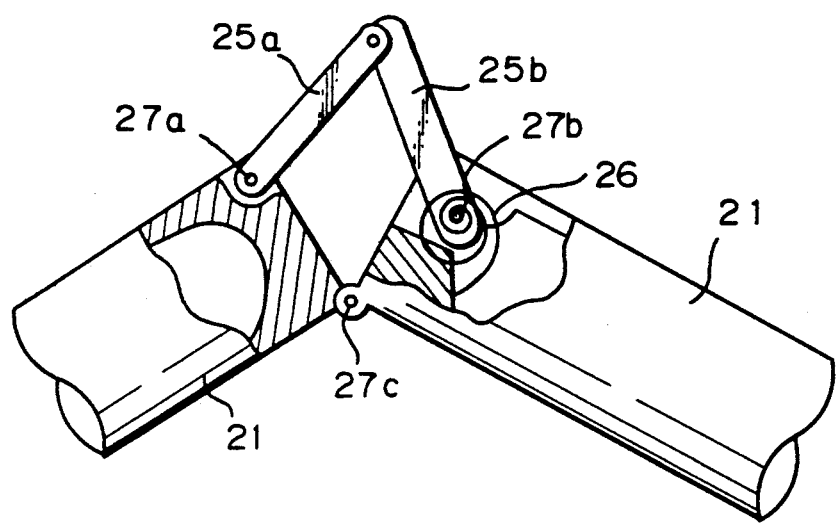
FIG. 14 is a partially cut away side view showing the constitution of the foldable members of the expandable framework structure shown in FIG. 13.
Figure 15:
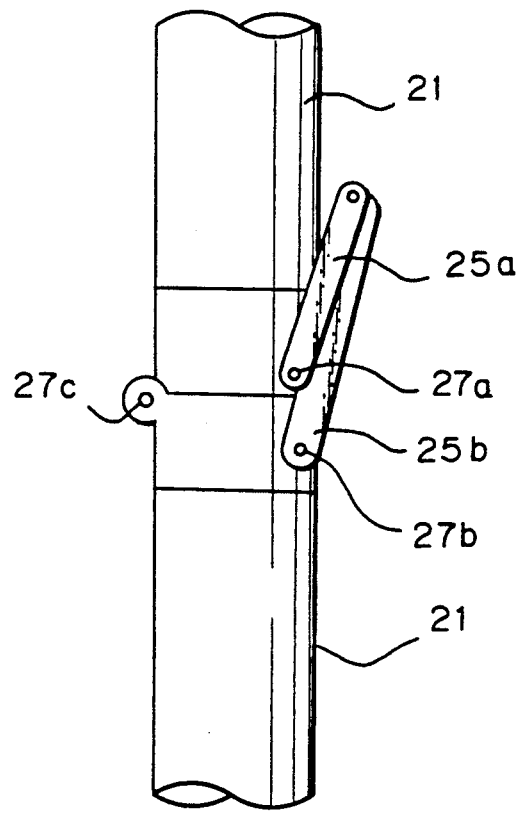
FIG. 15 is a side view of the foldable members shown in FIG. 14 showing the configuration of the same which have been expanded.

FIG. 5 is a perspective view of an expandable framework structure according to another embodiment of the present invention showing the configuration of the same which has been expanded, and FIG. 6 is a perspective view of the expandable framework structure shown in FIG. 5 showing the configuration of the same which is being expanded. FIGS. 7 and 8 are side views of the expandable framework structure shown in FIG. 5 showing the configurations of foldable members of the same which have been expanded and which are being developed, respectively. In these figures, reference numeral 31 denotes a vertical frame disposed at an angle of a polygonal prism and having main hinges 32 that are nonmovably and fixedly attached at the ends thereof; reference numeral 33 is a diagonal cable diagonally stretched on the top and bottom surfaces of the polygonal prism and connected to the main hinge 32 at the ends thereof; reference numeral 34 is a coil spring for providing a driving force to expand the framework structure; reference numeral 35 a synchronous rod for transmitting the expanding force generated by the coil spring 34 to a foldable member 36, reference numeral 37 an intermediate hinge for jointing the foldable member 36 at the intermediate portion thereof so as to allow it to be unfolded and folded: reference numeral 38a a pin acting as a rotational shaft about which the intermediate hinge 37 is rotated, reference numeral 38b a stopper surface formed on the intermediate hinge 37 with which an abutment surface is brought into contact when the foldable member 36 is developed and is linearly stretched; reference numeral 39 a fictitious line showing the position of the diagonal cable 33 when the foldable member 36 has been unfolded, and reference numerals 40a, 40b are joint-pins for use in pin-jointing the foldable member 36 to the main hinges 32. The rotational axis of the pin 38a is caused to deviate from the center axis (the fictitious line 39 connecting the joint-pin 40a to the joint-pin 40b) of the foldable member 36, realized after it has been unfolded in the direction reverse to the direction in which the foldable member 36 is folded. The diagonal cables 33 rest on the plane in which the center axis of the foldable members 36 are contained, and when seen in the direction of the rotational axis of the pin 38a, the cables 33 rest on the fictitious line 39.

The synchronous rods 35 are mounted to a coil spring support 41 that extends outwardly from one of the main hinges 32 on each of the vertical frame members 31. In general, only one coil spring 34 and coil spring support 41 is provided for each vertical frame member 31 and these supports 41 are generally mounted, in a preferred embodiment, on opposite main hinges on each of adjacent frame members. The coil spring support 41 is somewhat plunger-shaped, having an enlarged diameter head 42 at its outermost end. The head 42 has the synchronous rods 35 attached thereto. The smaller diameter stalk of the coil spring support 41 (shown generally as reference numeral 43) extends from the head 42 to the main hinge 32. The stalk can be sized to travel within a hollow inner diameter of the respective vertical frame member 31. Around the stalk is positioned the coil spring 34. The coil spring is restrained at its respective ends by the head 41 and upper face 45 of the main hinge 32.

When the intermediate foldable members 36 are folded downwardly (see FIG. 6), the synchronous rods 35 are brought into tension which causes the support 41 to move downwardly toward the main hinge 32, thus compressing the spring 34. Hence, in a folded state, the supports 41 exert significant tension on the synchronous rods 35. This tension allows the module to unfold in a deployed state. In such a deployed state, some minimal force is still exerted by the coil springs 34 on the supports 41 so as to assist in maintaining the deployed frame in a fully unfolded state. As will be described further below, the offset positioning of the stopper hinges 37, in combination with the residual tension generated by the coil springs 34 on the synchronous rods 35 further assists in maintaining the module in a deployed state in which predetermined force must be utilized to refold the module. Note that the fixed attachment of the main hinges 32 to their respective vertical frame members 31 results in a constant spacing between hinges in both a deployed and undeployed state and at all times therebetween. All tension is generated by the relatively shortmoving coil spring supports 41 during module expansion. Hence, a relatively linearly compact arrangement can be maintained using the module according to this embodiment.

The operation of the expandable framework structure according to another embodiment of the present invention depicted in FIGS. 5 to 8 will next be described. In the expandable framework structure of the second embodiment of the present invention, when the expandable framework structure is stowed, the foldable members 36 are folded at an intermediate position thereof by means of the intermediate hinges 37 in the directions in which the respective folded portions thereof deviate from the top and bottom surfaces of the polygonal prism, respectively, i.e., in the directions in which the respective folded portions moves toward the internal area of the side of the polygonal prism which the foldable members 36 partially constitute. The foldable members 36 are folded to such an extent that the angle formed between the vertical frames 31 and the foldable members 36 becomes nearly nil, and the so folded expandable framework structure is retained in such a state by means of an external retaining device (not shown). In contrast, when the structure is expanded, once the retaining device is released, the foldable members 36 are first raised by the action of the restoring force of the coil springs 34, which acts as driving force, via the synchronous rods 35 and the foldable members 36 are then gradually unfolded. When the respective foldable members 36 are unfolded to be linearly stretched, the respective stoppers 38 are brought into contact with a surface corresponding thereto, thereby generating a surface pressure which acts to restrict and cease the rotational operation of the respective foldable members 36, and the expansion of the expandable framework structure is thus terminated. The length of the diagonal cables 33 is adjusted in advance such as to exhibit a predetermined tension when they have been stretched between the main hinges 32 in synchronism with the termination of expansion of the foldable members 36. The so stretched diagonal cables 33 serve as a basic construction member for preventing the deformation of the top and bottom surfaces of the polygonal prism.

The constitutional characteristics of the expandable framework structure according to this second embodiment of the present invention are such that the rotational axis of the intermediate hinge 37 deviates from the center axis of the foldable member 36, which is realized when the latter has been unfolded, and that the plane in which the diagonal cables 3S are stretched rests on the center axis of the foldable member 36 which fictitiously connects the joint-pin 40a, disposed at one end of the foldable member 36, to the joint-pin 40b disposed at the other end thereof. The foldable member 36 is designed to be folded on the side opposed to the pin 38a relative to the center axis and is unfolded from its folded and stowed state through a state shown in FIG. 8 in which the foldable member 36 is being unfolded to a final expantion state shown in FIG. 7. The distance between the joint-pins 40a, 40b disposed at the ends of the foldable member 36, respectively, reaches its maximum when the joint-pins 40a, 40b and the pin 38a of the intermediate hinge 37 are brought into alignment with each other. In this state, the foldable member 36 has not been stretched completely linearly but is in a state very close to the completely stretched state. At the time when the foldable member 36 is developed to the final expansion state thereof, the distance between the joint-pins 40a, 40b is slightly less than its maximum length. In contrast, when the foldable member 36 is folded from its final expantion state the diagonal cable 33 stretched between the main hinges 32 must be re-stretched to its maximum length before it is folded. This means that in order to fold the once expanded expandable framework structure, additional energy must be applied so as to re-stretch the diagonal cable 33. This necessity for additional energy serves as a latch mechanism for preventing the expanded expandable framework structure from being easily folded even if external force is applied thereto, whereby the configuration of the expanded expandable framework structure can be stably maintained. In addition, this latching mechanism of the present invention comprises the diagonal cables 33 and the foldable members 36 which are essential construction members. This obviates the necessity for additional mechanisms comprising attachment components, and therefore the number of components used can be reduced to a minimum level. In FIG. 6, the diagonal cables 33 are omitted therefrom for the sake of simplicity.

In this second embodiment, hexagonal prism-like frame structures are used only to form the expandable framework structure, but other polygonal prism-like frame structures such as a quadrangular prism-like frame structure and so forth may be used. In addition, a number of such frame structures may be connected together to form a large-scale expandable framework structure.

Furthermore, the foldable members 36 and the intermediate hinges 37 which are used as constituent elements in the embodiment shown in FIG. 5 may be used in the embodiment shown in FIG. 1 in place of the cables 6 provided to be stretched between the adjacent slide hinges or joints 1, in which case the same advantages as those offered in the former embodiment may be offered. The coil springs 34 and the synchronous rods 35 may be used as a driving source for expansion of the structure together with the foldable members 36.

The expandable framework structure of the present invention, is constructed in such a way that the foldable and expandable framework structure elements which serve as base elements, comprise stems each having a joint as well as a slide hinge and pairs of pantograph-like diagonal members. Each pair of the latter are pin-jointed to the associated joints and slide hinges on the stems, as well as being pin-jointed to each other at the intermediate portions thereof. The base elements so configured are connected together so as to form a polygonal prism like a quadrangular or hexagonal prism with one side of the respective base elements serving as a side common to two adjacent base elements. It is therefore possible to construct a highly rigid expandable framework structure like a reflector support structure for a large-diameter expandable antenna. In addition, since the frame structures functioning as base elements are formed like a pantograph, all of the expandable members are expanded in a synchronous fashion, and the so constructed expandable framework structure can thus provide high stability and reliability. Furthermore, the cables are adapted to stretch when the framework structure has been expanded, any rattling of the connecting pin at the pin connected portion can be eliminated. Thus, the present invention can advantageously provide an expandable framework structure that is capable of maintaining a stable highly rigid, configuration after it has been unfolded.

Furthermore, the expandable framework structure according to the present invention is comprised of base elements each comprising in turn a plurality of frame members jointed to each other by means of a plurality of hinges, and it is constructed in such a way that the respective foldable members disposed between the main hinges are pin-jointed by means of the intermediate hinges in such a manner as to be allowed to linearly stretch when they are expanded, so that the rotational axis of the pin used deviates from the center axis of the foldable member that would be realized when it has been developed. And the diagonal cable stretched between the main hinges under a predetermined tension rests on the center axis of the foldable member that would be realized when it is developed. The configuration of the expandable framework structure can be stabilized as in the case where a latch mechanism is used without additional mechanisms comprising attachment components. Thus, the present invention can advantageously provide an expandable framework structure that requires less components, which is light and easy to stow away, and which serves to further improve the stability of its configuration after it has been expanded.

What is claimed is:

1. A module for an expandable framework structure adapted to form an orthogonal prism-like framework structure when expanded, the module comprising:

a plurality of vertical frame members adapted to expand in a direction radially outwardly from and being parallel to a central vertical axis of the orthogonal prism when the module is fully expanded;

hinge means attached at opposite ends of each of the vertical frame members, one of the hinge means on each of the frame members comprising a hinge and a coil spring, the coil spring having one end engaging the hinge and an opposite end engaging a coil spring support that moves vertically relative to the hinge and that extends outwardly from the end of the vertical frame member, the coil spring being compressed between the hinge and the coil spring support, the hinge being positioned at an equal distance from an opposing hinge of the respective vertical frame member in each of an expanded position and a partially folded position;

foldable members joined to each of the main hinges and connecting adjacent vertical frame members to form an orthogonal prism, the foldable members each including an intermediate hinge that allows the foldable members to fold substantially parallel to each of the vertical members when the module is unexpanded and to unfold to be disposed substantially perpendicular to each of the adjacent vertical members when the module is fully expanded;

a plurality of diagonal cables located between opposing main hinges along respective top and bottom surfaces of the orthongonal prism, the cables sized to be in predetermined tension between the opposing main hinges when the module is fully expanded, each of the diagonal cables lying substantially in a plane with a center axis of each of the foldable members when the module is fully expanded and a rotational axis of each intermediate hinge positioned outside of and parallel to the plane when the module is fully expanded;

a stopper located on the intermediate hinge for preventing extension of hinged sections of the foldable member beyond 180° relative to each other when the module is fully expanded; and a synchronous rod joined at one end to each adjacent hinged section of each of the foldable members and joined at an opposing end to a respective coil spring support, the synchronous rod being in tension in response to compression of the coil spring and the synchronous rod transmitting driving force from the coil spring to one of the foldable members to expand the module.

2. A module according to claim 1, wherein said orthogonal prism is a quadrangular prism.

3. A module according to claim 1, wherein said orthogonal prism is a hexagonal prism.

4. An expandable framework structure formed by continuously connecting together a plurality of modules for an expandable framework structure, the modules each comprising a framework structure module adapted to form an orthogonal prism when the module has been fully expanded and each of the modules being continuously connected together in such a manner that one side of the orthogonal prism is adapted to serve also as one side of an adjacent orthogonal prism, wherein the modules each comprise:

a plurality of vertical frame members adapted to expand in a direction radially outwardly from and being parallel to a central vertical axis of the orthogonal prism when the module has been fully expanded;

hinge means attached at opposite ends of each of the vertical frame members, one of the hinge means on each of the frame members comprising a hinge and a coil spring, the coil spring having one end engaging the hinge and an opposite end engaging a coil spring support that moves vertically relative to the hinge and that extends outwardly from the end of the vertical frame member, the coil spring being compressed between the hinge and the coil spring support, the hinge being positioned at an equal distance from an opposing hinge of the respective vertical frame member in each of an expanded position and a partially folded position;

foldable members joined to each of the main hinges and connecting adjacent vertical frame members to form an orthogonal prism, the foldable members each including an intermediate hinge that allows the foldable members to fold substantially parallel to each of the vertical members when the module is unexpanded and to unfold to be disposed substantially perpendicular to each of the adjacent vertical members when the module is fully expanded;

a plurality of diagonal cables located between opposing main hinges along respective top and bottom surfaces of the orthongonal prism, the cables sized to be in predetermined tension between the opposing main hinges when the module is fully expanded, each of the diagonal cables lying substantially in a plane with a center axis of each of the foldable members when the module is fully expanded and a rotational axis of each intermediate hinge positioned outside of and parallel to the plane when the module is fully expanded;

a stopper located on the intermediate hinge for preventing extension of hinged sections of the foldable member beyond 180° when the module is fully expanded; and a sychronous rod joined at one end to each adjacent hinged section of each of the foldable members and joined at an opposing end to a respective coil spring support, the synchronous rod being in tension in response to compression of the coil spring and the synchronous rod transmitting driving force from the coil spring to one of the foldable members to expand the module.

5. An expandable framework structure according to claim 4, wherein said orthogonal prism is a quadrangular prism.

6. An expandable framework structure according to claim 4, wherein said orthogonal prism is a hexagonal prism.

7. An expandable module for an expandable framework structure comprising a plurality of modules comprising:
- a plurality of vertical frame members disposed about a vertical axis and being parallel to the vertical axis, the frame members defining the corners of an orthogonal prism when the module is in a fully expanded state;
- hinges attached to each of opposing ends of each of the vertical frame members;
- intermediate foldable members extending between each of adjacent hinges on each of adjacent vertical frame members, the intermediate foldable members defining sides of the orthogonal prism and each of the foldable members lying in one of a top and a bottom plane of the prism when the module is in a fully expanded state;
- intermediate hinges positioned substantially in the middle of each of the intermediate foldable members, the hinges constructed and arranged to allow the intermediate foldable members to fold at the hinges and at the intermediate hinges so that each of the intermediate foldable members may be folded into two folding sections thereby bringing each vertical frame members into closer proximity with adjacent vertical frame members, each intermediate hinge including a pivot that is positioned out of line with a center axis of the intermediate member and each intermediate hinge including a stopper that prevents the intermediate hinge from folding beyond 180° so that the spacing between adjacent vertical frame members must be increased slightly to move the intermediate foldable members from an unfolded fully expanded module position to a folded partially expanded module position;
- a coil spring and a vertically movable coil spring support positioned at one of the ends of each of the vertical frame members, the coil spring and coil spring support of each vertical frame member being on an opposite end of the vertical frame member from that on each of adjacent vertical frame members, the coil spring support including an enlarged end section with the coil spring support including an enlarged end section with the coil spring positioned in compression between the enlarged end section and the hinge, the coil spring support end section extending vertically outwardly from the respective end of the vertical frame member further than the respective end of the vertical frame member;
- a pair of synchronous rods extending from the end section of each coil spring support to each adjacent folding section of each of adjacent intermediate foldable members, the coil spring support moving vertically away from the hinge under compression of the coil spring to provide tension to the synchronous rods to pull the adjacent sections of the intermediate foldable members into an unfolded position wherein the module is fully expanded; and
- a plurality of diagonal cables extending from each hinge to a hinge on an opposing vertical frame member, the cables lying substantially in the top plane and the bottom plane of the orthogonal prism and the cables each having a length that causes slight tension therein when the module is fully expanded so that the intermediate foldable members are maintained by the tension in an unfolded position when the module is fully expanded.

8. A module according to claim 7 wherein the orthongonal prism comprises a hexagonal prism with each of the vertical frame members defining a corner of a hexagon.

9. A module according to claim 8 further comprising a plurality of diagonal cables extending between hinges located on opposite ends of adjacent vertical frame members so as to form a crossing pattern on each side of the orthongonal prism.

* * * * *